Feb. 9, 1971  HIROFUMI TOMIYAMA  3,561,303
FLOW CONTROL DEVICES FOR TURRET SLIDES
Original Filed Aug. 1, 1967  2 Sheets-Sheet 1

INVENTOR
HIROFUMI TOMIYAMA
BY
Marmork & Bierman  ATTORNEYS

United States Patent Office 3,561,303
Patented Feb. 9, 1971

3,561,303
FLOW CONTROL DEVICES FOR TURRET SLIDES
Hirofumi Tomiyama, 1000 Akiwa, Uedo-shi,
Nagano-ken, Japan
Original application Aug. 1, 1967, Ser. No. 657,605, now Patent No. 3,493,170. Divided and this application June 18, 1969, Ser. No. 842,767
Int. Cl. B23b 21/00
U.S. Cl. 82—21     1 Claim

ABSTRACT OF THE DISCLOSURE

Only one flow control valve including a rotary throttle valve stem is used, and the rotary valve stem is rotated by a rack and gear mechanism which is actuated by a rotary indexing member. The rotary indexing member carries a plurality of adjustable stops that limit the stroke of the rack.

The above described flow control device is utilized in a turret slide control system of an automatic turret device to control the feed speed of the tool as well as the speed at which the tool is advanced toward or retracted from the workpiece.

---

This application is a division of application Ser. No. 657,605, filed Aug. 1, 1967 and now Pat. No. 3,493,170.

This invention relates to a flow control device and a turret slide control system utilizing the same.

In the control of a turret slide of an automatic turret device, it has been the practice to advance and retract a tool at high speeds to and from a workpiece before and after its working and to feed the tool at relatively low speeds corresponding to indexed positions thereof. The flow control device of this invention is especially suitable for controlling in such a manner the turret slide of automatic turret devices. Heretobefore, for such a flow control device, use was made of a flow control valve specially designed for this purpose or a plurality of standard flow control valves of the number corresponding to the number of indexed positions of the turret. Manufacture of flow control valves utilized in machine tools of high accuracy requires a special skill, so that they are manufactured only by special manufacturers. Further, even standard flow control valves are fairly expensive, so that total cost thereof with respect to the cost of the turret device becomes a substantial proportion because their number should be equal to the number of indexed positions (usually six) of the turret.

One object of this invention is to provide a novel flow control device which requires only one flow control valve irrespective of the number of indexed positions of the turret, and which can be manufactured readily without any particular skill.

Another object of this invention is to provide a novel turret slide control system which can move the slide at various speeds with a simple flow control device.

According to one aspect of this invention there is provided a flow control device for a turret slide of an automatic turret device comprising a flow control valve having a rotary throttle valve stem, a gear secured to said valve stem, a rack cooperating with said gear, a first piston-cylinder assembly to advance and retract said rack, a rotary shaft, an indexing member secured to said rotary shaft, a second piston-cylinder assembly adapted to index said rotary shaft through a one-way clutch means, a plurality of adjustable stops carried by said indexing member, said indexing member being arranged to bring a selected one of said stops to a position which limits forward movement of said rack, and means to lock said indexing member in one of its indexed positions. Thus, by means of said second piston-cylinder assemblies the indexing member can be moved to any indexed position to establish desired throttling of the flow control valve.

According to another aspect of this invention there is provided a turret slide control system for an automatic turret device comprising a flow control device of the construction just described, a turret slide, a plurality of limit switches associated with said turret slide, a third piston-cylinder assembly adapted to operate said turret slide, a source of fluid pressure, a first change-over valve controlled by said limit switches to selectively supply said fluid under pressure to said first, second, and third piston-cylinder assemblies, means to connect said flow control valve to said third piston-cylinder assembly, and a second change-over valve controlled by said limit switches to establish or interrupt a path for said fluid pressure around said flow control valve.

The novel features which characterize my invention are set forth with particularity in the appended claim. The invention itself, however, both as to its organization and method of operation together with further objects and advantages thereof may best be understood by reference to the following description taken in conjunction with the accompanying drawing in which:

Figure 1:
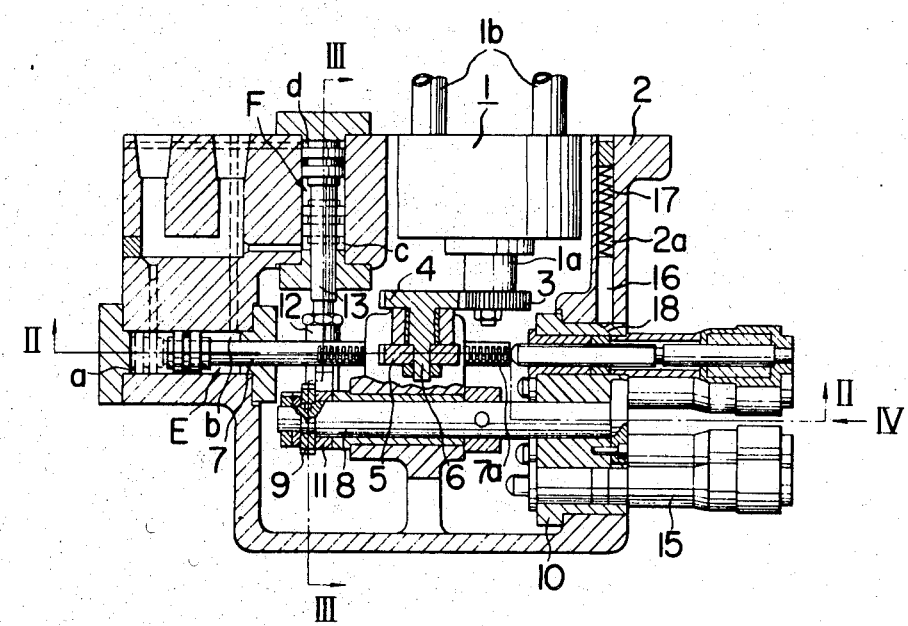
FIG. 1 shows a cross-section of a flow control device embodying this invention.
Figure 2:
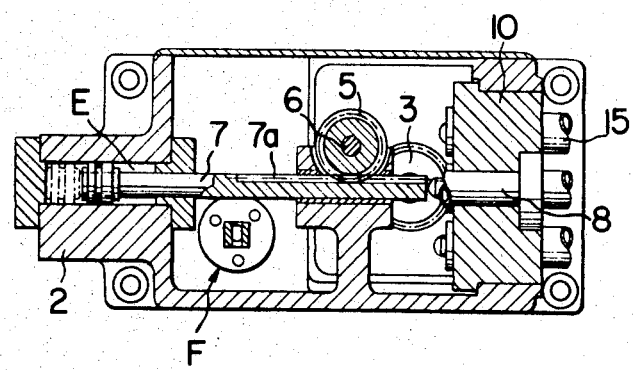
FIG. 2 is a cross-sectional view of the flow control device shown in FIG. 1 taken along a line II—II.
Figure 3:
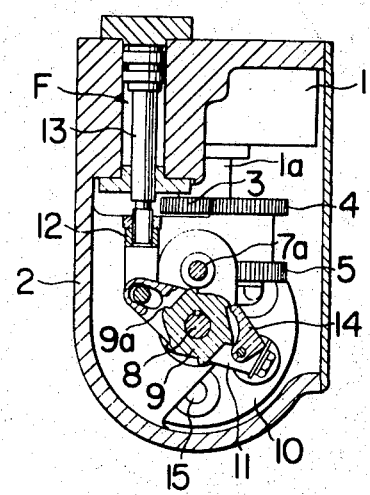
FIG. 3 is a cross-sectional view taken along a line III—III in FIG. 1.
Figure 4:
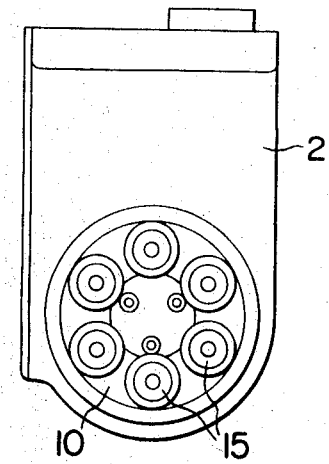
FIG. 4 is an end view of the flow control device shown in FIG. 1 as viewed in the direction of arrow IV.

A preferred embodiment illustrated in the accompanying drawing utilizes a well known standard flow control valve 1 available on the market which includes a rotary throttle valve stem 1a to control flow of liquid through pipes 1b. A gear 3 is mounted on one end of valve stem 1a to mesh with a gear 4 integral with a shaft 6 journaled by casing 2. Ordinarily, the standard flow control valve is provided with a knob so that gear 3 may be substituted for such a knob. A gear 5 mounted on shaft 6 meshes with a gear rack 7a provided for a piston rod 7 of a first piston-cylinder assembly E having a cylinder integral with casing 2. A ratchet wheel 9 and an indexing member 10 rotatably received in an opening through a side wall of casing 2 are fixedly secured to shaft 8, and a lever 11 is freely mounted on shaft 8 adjacent ratchet wheel 9. One end of lever 11 is connected to a piston rod 13 of a second piston-cylinder assembly F through an adjusting member 12, said second assembly F including a cylinder integral with the casing, while the other end of lever 11 is pivotally connected to a pawl 14 cooperating with teeth 9a of a ratchet wheel 9. Indexing member 10 includes a plurality of equally spaced adjustable stops 15 which are individually brought in the path of reciprocating rack 7a each time indexing member 10 indexes. A detent pin 16 biased by a spring 17 contained in a bore through casing 2 is provided to cooperate with notches 18 provided on the outer periphery of indexing member 10 at equal spacings.

The operation of the flow control device is as follows: When piston rods 7 and 13 are in positions indicated by dot and dash lines shown in FIG. 1, admission of pressurized fluid into a chamber a of the first piston-cylinder assembly E and a chamber c of the second piston-cylinder assembly F causes piston rod 7 to advance, whereby throttle valve stem 1a which has been in the fully open position is rotated through rack 7a, and gears 5, 4 and 3 until rack 7a engages one of the stops 15 which has been adjusted to a predetermined position. Thus, the valve stem 1a is set to a predetermined throttling position. At the same time, piston rod 13 is retracted without causing any effect upon indexing member 10 by the action of a one-way clutch consisting of pawl 14 and ratchet wheel 9. Thus both piston rods are moved to positions indicated by solid lines. Then pressurized fluid is admitted into a chamber b of the first piston-cylinder assembly E and a chamber d of the second piston-cylinder assembly F to retract piston rod 7, to move again throttle valve stem 1a to fully open position, and to advance piston rod 13 thereby to move indexing member 10 by one step through predetermined steps via lever 11, pawl 14, ratchet wheel 9 and shaft 8 to bring another one of stops 15 in front of rack 7a. Concurrently with this indexing operation, detent pin 16 engages another one of notches 18 to hold indexing member 10 to the indexed position. The above described operation is repeated for each indexing operation.

Figure 5:
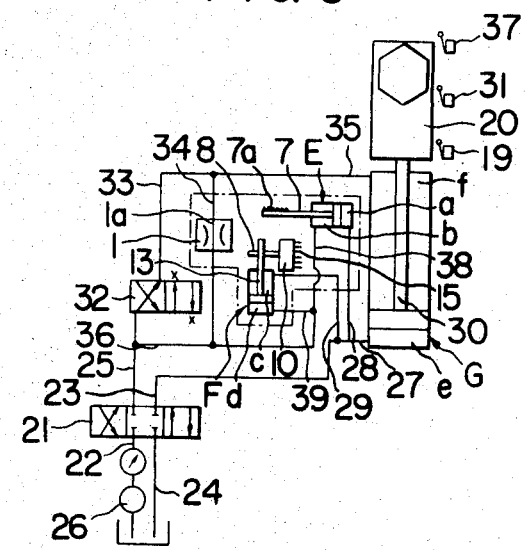
FIG. 5 shows a circuit diagram illustrating a turret slide control system employing the novel flow control device.

When incorporated in a turret slide control system as shown in FIG. 5, the novel flow control device constructed as above described can rapidly and smoothly switch between quick approach and withdrawal controls of the tool to and from the workpiece and slow feed control of the tool commensurate with its indexed working position.

Referring now to FIG. 5, when a starting switch (not shown) is operated by an operator or a limit switch 19 is operated by the return stroke of a turret slide 20, a change-over valve 21 is operated to interconnect conduits 22 and 23 and conduits 24 and 25, respectively, whereupon the pressurized fluid from a pump 26 is supplied to conduits 27, 28, and 29 through conduit 23. The fluid in conduit 27 then enters into a chamber e in a piston-cylinder assembly G provided for controlling the turret slide 20 connected to the outer end of a piston rod 30, thus quickly advancing the turret slide. The fluid supplied to conduit 28 enters into chamber a of said first piston-cylinder assembly E to advance rack 7a until it abuts against one of the stops 15, whereby the throttle valve stem 1a is rotated by an amount commensurate with the amount of working feed of the tool. Further, the fluid in the conduit 29 enters chamber c of the second piston-cylinder assembly F to retract piston rod 13, thus preparing for the next indexing operation. Upon actuation of a limit switch 31 by the advance movement of turret slide 20, another change-over valve 32 is operated to disconnect conduit 25 from conduit 33. Under this condition, fluid in chamber f of piston-cylinder assembly G for controlling the slide can return only through a circuit including a conduit 35, a conduit 34 (corresponding to pipes 1b in FIG. 1) including flow control valve 1 which has been throttled as mentioned above by the rotation of valve stem 1a, and conduits 36 and 25. Thus, the resistance of the fluid contained in chamber f against the forward movement of piston rod 30 is increased to provide a slow working feed. As the turret slide is advanced further, a third limit switch 37 is actuated to operate change-over valves 21 and 32 to interconnect conduits 22 and 25, 24 and 23, and 25 and 33, respectively. Thus, a portion of the pressurized fluid supplied from pump 26 to conduit 33 through conduit 32 is supplied to conduit 35 through conduits 36 and 34, and the other portion is supplied to conduits 38 and 39 through conduit 36. The fluid supplied to conduit 35 enters into chamber f of piston-cylinder assembly G to quickly return turret slide 20. On the other hand the fluid supplied to conduit 38 enters into chamber b of the first piston-cylinder assembly E to retract rack 7a and to rotate valve stem 1a to the fully open position. Further, the fluid supplied to conduit 39 enters chamber d of the second piston-cylinder assembly F to operate indexing member 10 to bring another one of stoppers 15 which controls the next working feed of the tool to a position in front of rack 7a. A similar operation is effected for each indexing operation. Thus, this invention provides a simple and efficient flow control device which employs only one flow control valve but can control the flow quantity therethrough in accordance with the desired indexed position. This invention also provides a novel turret slide control system for an automatic turret device which can control the speed of the tool to any selected valve.

While the invention has been described in connection with preferred embodiments thereof it will be clear to those skilled in the art that many modifications may be made without departing from the true spirit and scope of the invention as defined in the appended claim.

What is claimed is:

1. A turret slide control system for an automatic turret device, comprising a flow control device including a flow control valve having a rotary throttle valve stem, a gear secured to said valve stem, a rack cooperating with said gear, a first piston-cylinder assembly to advance and retract said rack, a rotary shaft, an indexing member secured to said rotary shaft, a second piston-cylinder assembly adapted to index said rotary shaft through a one-way clutch means, a plurality of adjustable stops carried by said indexing member, said indexing member being arranged to bring a selected one of said stops to a position which limits forward movement of said rack and means to lock said indexing member in one of its indexed positions;

a turret slide;

a plurality of limit switches associated with said turret slide;

a third piston-cylinder assembly adapted to operate said turret slide;

a source of fluid pressure;

a first change-over valve controlled by said limit switches to selectively supply said fluid pressure to said first, second and third piston-cylinder assemblies;

means to connect said flow control valve to said third piston-cylinder assembly; and a second change-over valve controlled by said limit switches to establish or interrupt a path for said fluid pressure around said flow control valve.

References Cited
UNITED STATES PATENTS 3,043,278   7/1962   Ackerman _____ 82—21X
3,060,466   10/1962  Kozacka _____ 82—21X LEONIDAS VLACHOS, Primary Examiner U.S. Cl. X.R.

77—25, 32.1, 33.5